United States Patent [19]

Nash

[11] 4,191,205

[45] Mar. 4, 1980

[54] THERMOPLASTIC CHECK VALVE

[76] Inventor: Franklin A. Nash, 4817 Welford, Bellaire, Tex. 77401

[21] Appl. No.: 888,627

[22] Filed: Mar. 21, 1978

[51] Int. Cl.² ............................................. F16K 15/03
[52] U.S. Cl. .................................... 137/375; 137/527.8
[58] Field of Search ................. 137/527, 527.2, 527.4, 137/527.8, 375, 515.7, 855, 856, 857, 858

[56] References Cited

U.S. PATENT DOCUMENTS

| | | | |
|---|---|---|---|
| 182,355 | 9/1876 | Campbell | 137/527 |
| 314,107 | 3/1885 | Chappeli | |
| 1,348,562 | 8/1920 | Hauser | 137/527.8 |
| 1,788,358 | 1/1931 | Goerg | |
| 2,386,485 | 10/1945 | Longenecker | |
| 2,767,735 | 10/1956 | Darling | |
| 3,168,283 | 2/1965 | Gamble | |
| 3,295,547 | 1/1967 | Scaramucci | |
| 3,327,732 | 6/1967 | Deve | |
| 3,509,908 | 5/1970 | Latham | |
| 3,565,099 | 2/1971 | Huber | |
| 3,565,107 | 2/1971 | Bunch | |
| 3,612,097 | 10/1971 | Prince | |
| 3,613,720 | 10/1971 | Welch | |
| 3,664,775 | 5/1972 | Stigberg | |
| 3,720,225 | 3/1973 | Wheatley | |
| 3,933,173 | 1/1976 | Kajita | 137/515.7 X |
| 4,034,780 | 7/1977 | Horvath | 137/527 X |

Primary Examiner—Robert G. Nilson
Attorney, Agent, or Firm—Arnold, White & Durkee

[57] ABSTRACT

A streamlined cylindrical flapper check valve is provided for use in fluid handling pipelines where corrosive products are being pumped. A cylindrical metal sleeve surrounds two cylindrical thermoplastic or thermoset elements, an upstream element having a throughhole of the same diameter as the pipeline and a downstream element with a throughhole larger than the pipeline diameter. A rotatable thermoplastic or thermoset flapper is mounted to the downstream element and rotates into a cavity in the downstream element to permit the full-flow passage of the product. The interface at which the two elements are in contact is inclined to the centerline axis of the central passage of the valve to permit the flapper, in the absense of flow in the line, to contact the sealing surface of the upstream element before the flapper becomes perpendicular to the centerline axis. This permits the valve to seal against backflow at a lower back pressure without the requirement of an extra pressure element urging the flapper into contact with the sealing surface as is the case when the sealing surface is vertical.

13 Claims, 4 Drawing Figures

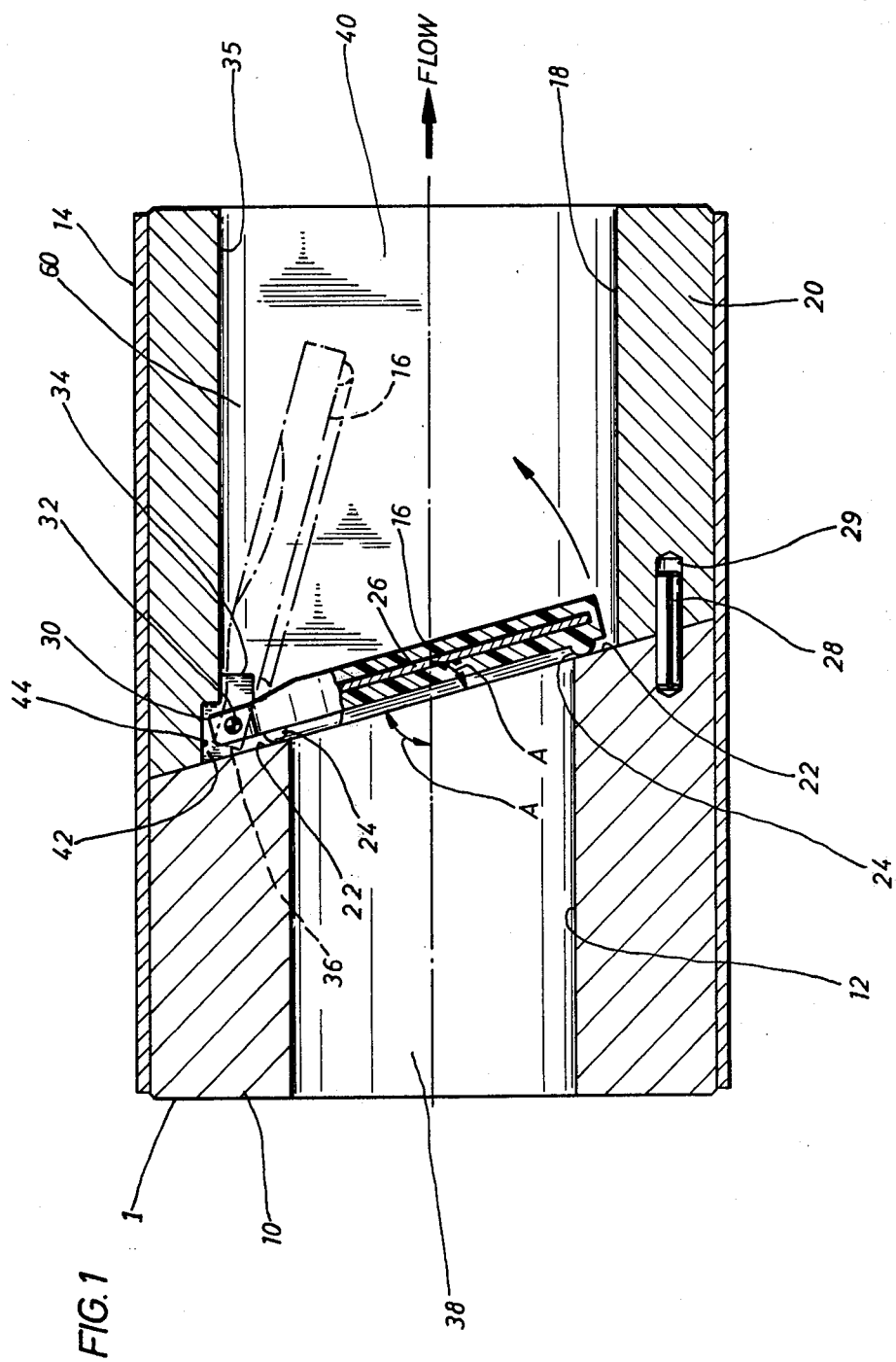

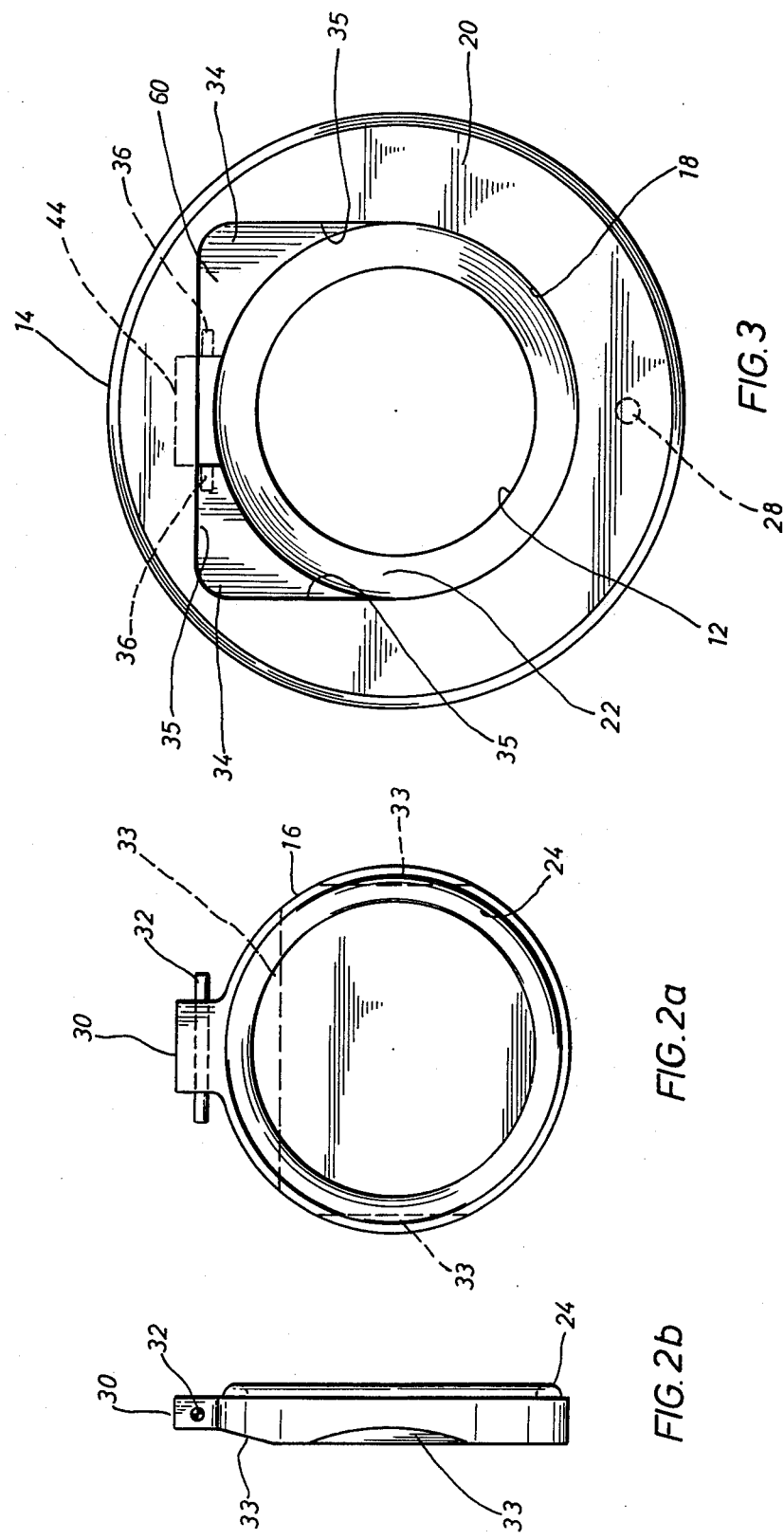

4,191,205

THERMOPLASTIC CHECK VALVE

BACKGROUND OF THE INVENTION

The present invention relates generally to check valves for passing fluids in one direction but preventing fluid flow in the opposite direction. More particularly, to a flapper check valve for use in fluid handling systems where corrosive products are pumped.

In the past, corrosive fluid handling systems requiring check valves have used ball type check valves. These ball check valves were of standard design and were constructed from metal parts. However, they require that their internal surfaces be coated with a thermoplastic or thermoset material that is impervious to the caustic product flowing in the pipeline. The thermoplastic material was bonded to the internal surfaces of the ball check valve through an expensive injection molding process. It was necessary to coat these surfaces to protect the metal parts of the valve from destruction from the caustic fluids. The ball that was used to check the back flow of the caustic fluids was usually made from tetrafluoroethylene (TFE), a material commonly known by the name TEFLON, a registered trademark of DuPont.

A major disadvantage of these prior-art ball check valves was that Teflon does not have memory, i.e. once the Teflon has been deformed, it tends to stay deformed. To check the backflow through the valve, the check ball is cradled in a seat that surrounds an internal opening that was part of the through passage of the valve. The ball, acting against the seat, formed the seal that prevented any back flow. Unfortunately, the ball often times is checked (driven against the seat by the fluid attempting to flow in the opposite direction) against the seat abruptly. Sometimes this abrupt check causes the seat to produce a ring or indentation in the ball. Eventually, the ball begins to lose its generally spherical shape as a result of the repeated checkings and begins to lose its ability to seal against the seat.

A solution to the problem to the Teflon ball wearing out from repeated checkings is to substitute a metal ball and metal seat made from an exotic and expensive metal alloy such as Monel (an alloy of stainless steel and nickel). These metal balls and seats are not coated with a thermoplatic material and eventually are destroyed by the caustic fluids although they tend to last longer than the Teflon balls.

Another disadvantage of ball check valves is that they must be mounted vertically to work properly. In a vertical orientation, the ball falls into the seat, due to gravity, when flow through the valve is zero. In a horizontal position, the ball moves into the seat only if there is reverse flow and, once a seal is formed, there is sufficient back pressure to hold the ball in the seat.

The disadvantages discussed above of ball type check valve are not present in flapper type check valves. The flapper seals against a flat surface and does not experience the deterioration to the sealing surfaces that the ball in the ball check valve does. Also, flapper check valves may be installed in any orientation.

While flapper type check valves are known in the art, workable designs for flapper check valves for use in fluid handling systems where corrosive fluids are involved have not been developed. Thus, it would be advantageous to provide a flapper type check valve for use in corrosive fluid handling systems where the internal check valve parts are impervious to the corrosive fluids. It would also be advantageous to provide a flapper check valve of either the flange or waffer design that was both inexpensive to manufacture and simple to service. It would also be advantageous to provide a streamlined flapper check valve where all parts of the valve were contained within a cylindrical metal sleeve having no cumbersome exterior bonnets to accommodate the hinged flapper. It would also be advantageous to provide a flapper check valve in which the flapper seals the through passage of the valve at a smaller back pressure than is normally required in valves of that type design without the need for a spring to urge the flapper against the sealing surface when the flow is zero.

SUMMARY OF THE INVENTION

In accordance with this invention, a streamlined flapper check valve is provided in which all of the internal components are constructed from a thermoplastic, thermoset or elastomeric (hereinafter thermoplastic) material impervious to corrosive fluids with which it will be used. A cylindrical stainless steel sleeve surrounds two cylindrical thermoplastic liners, an upstream liner and a downstream liner. The upstream liner contains a throughhole of a diameter equal to the diameter of the fluid handling system pipeline in which the valve should be installed. The downstream liner contains a throughhole of a diameter greater than the upstream liner. The downstream liner is further modified to contain a recessed cavity for permitting the flapper, mounted to the downstream liner, to rotate up and out of the flow stream to permit full-flow through the valve. The upstream and downstream liners are in contact with one another so that the throughholes of the liners define the central passage of the valve. The mating surfaces of the upstream and downstream liners are cut at an angle inclined to the center-line axis of the throughholes. The inclined mating surface of the upstream liner not in contact with the downstream liner defines an annular sealing surface around the throughhole of the upstream liner on which the flapper seals against back flow.

The flapper is also constructed from a thermoplastic material and has a circular domed-shaped sealing surface that seals against the upstream liner sealing surface. Molded into the flapper is a stainless steel screen which increases the weight and strength of the flapper. The flapper is pivoted on a thermoplastic pin or trunnion which is also impervious to the corrosive fluids. The inclined sealing surface of the upstream thermoplastic liner causes the flapper to contact the sealing surface at an angle other than vertical. Thus, the weight of the flapper, regardless of the orientation, initiates a seal and permits an effective seal against backflow at a lower internal pressure. A guidepin is provided in the upstream liner and an oppositely facing hole is provided in the downstream liner to guide the two thermoplastic liners into contact inside the metal sleeve.

BRIEF DESCRIPTION OF THE DRAWINGS

For a fuller understanding of the nature and objects of the invention, reference should be had to the following detailed description taken in connection with the accompanying drawings, in which:

FIG. 1 is a cross sectional view of the thermoplastic flapper check valve;

FIG. 2(a) and FIG. 2(b) is an end and a side view of the flapper, respectively; and FIG. 3 is the flapper check valve as viewed from the downstream end with the flapper removed.

Similar referencee characters refer to similar parts throughout the several views of the drawings.

DETAILED DESCRIPTION OF THE PREFERRED EMBODIMENT

Referring first to FIG. 1 which illustrates a cross sectional view of the thermoplastic flapper check valve, the valve 1 is shown composed of four major components, a cylindrical metal sleeve 14, an upstream thermoplastic liner 10, a downstream thermoplastic liner 20 and a flapper 16. Upstream liner 10 is shown contacting downstream liner 20 at interface 42 which is inclined at an angle A to the center-line axis of the central passageway of the valve 1. The angle A in the preferred embodiment of valve 1 is approximately 10 degrees but proper operation could be obtained if angle A is within the range of 5 to 20 degrees. While the valve works, at angles outside this range, the best performance is obtained when the angle is within the range. Upstream liner 10 contains a throughhole 38 whose diameter is equal to the diameter of the fluid handling system lines in which the valve 1 is to be used. Downstream liner 20 has a throughhole 40 of a diameter greater than the diameter of throughhole 38. The center-line axes of throughholes 38 and 40 are in alignment and define the central passageway through valve 1. The throughhole 40 of downstream liner 20 is further modified (see FIG. 3) to permit flapper 16 to rotate up and into a cavity 60 of liner 20 to permit the full-flow of the corrosive fluids through the valve 1. This recess cavity is illustrated in FIG. 3 in which the upper half of the internal surface 18 of throughhole 40 of the downstream liner has been removed to create cavity 60 defined by the surface 34 and 35.

FIG. 1 also illustrates the flapper 16 resting against an annular sealing surface 22 of the upstream liner 10 in which the domed shaped circular sealing ring 24 of flapper 16 (see FIG. 2(a)) acting against sealing surface 22 generates the seal to prevent back flow through the valve. Molded into the flapper 16 is a stainless steel wire screen 26 which provides added rigidity and strength to flapper 16 to enable it to seal against greater back pressures than would be possible without the screen. A metal screen is required rather than a solid plate because, in the molding process, the thermoplastic must flow through the metal screen to keep the metal from moving from the middle of the flapper 16. Although stainless steel is used for the screen, other wire screens would be possible because the screen is molded inside the thermoplastic and is protected from the corrosive fluids. Flapper 16 is also illustrated in FIG. 1, in dotted lines, in its full open position in the recessed cavity cut into downstream liner 20. Referring now to FIG. 2(a) and FIG. 2(b) which illustrates an end view and side view of flapper 16 respectively, a thermoplastic pin 32 is shown inserted through a radial extension 30 of generally disc shaped flapper 16. Pin 32 forms a trunnion for flapper 16 on which the flapper 16 is pivoted in downstream liner 20. A cut out 44 and slots 36 are provided in the mating end of downstream liner 20 opposite the flapper cavity 60 to provide clearance for the radial extension 30 and for receiving trunnion 32 of flapper 16 respectively. When trunnion 32 is in slot 36 flapper 16 is supported in the downstream liner 20 and rotates from the full open to the full closed positions about trunnion 32. Cut out 44 permits radial extension 30 to swing an arc as the flapper 16 moves from the full open to the full closed positions.

Referring now to FIG. 2(a) and FIG. 2(b), the sealing surface 24 of flapper 16 is shown as a generally dome-shaped raised circular ring molded on the side of the flapper 16 that rests against the sealing surface of the upstream liner 10. Referring now to FIG. 3, the internal surface 12 of the upstream liner 10 throughhole 38 is shown in relation to the internal surface 18 of the downstream liner 20 throughhole 40. The area of the upstream liner 10 mating end between the internal surface 12 of upstream liner 10 and internal surface 18 of the downstream liner 20 is the annular sealing surface 22 against which the sealing ring 24 of flapper 16 comes to rest when the flapper 16 is in the closed or check position. Again referring to FIG. 2(a) and FIG. 2(b), cut to the edge in the side of flapper 16 opposite the side containing the sealing ring 24 are bevels 33. The bevels 33 are cut to the outside edge of the back side of flapper 16 at a point below the radial extension 30 and on the edges displace 90° to either side of the extension 30. The slope of bevels 33 is approximately 10 degrees. The purpose of bevels 33 is to permit flapper 16 to rotate further into the cavity 60 (see FIG. 1 and FIG. 3) in the downstream liner 20 than would be possible without the bevels. The radius of the corners in the recess cavity 60 requires that the flapper 16 contain the bevels in order to allow the flapper to rotate completely out of the throughhole passage of valve 1 to permit full-flow through the valve.

Again referring to FIG. 1, a guidepin 28 is shown mounted in upstream liner 10. Contained in downstream liner 20 is an oppositely facing hole 29 for receiving the guidepin 28. Guidepin 28 functions to align and guide the downstream liner 20 into contact with upstream liner 10 when the two thermoplastic liners are assembled within sleeve 14. The guide pin 28 may be mounted into either of the liners with the oppositely facing hole contained in the other liner for accepting the pin during the assembly of the two liners. FIG. 1 also illustrates that when assembled, the thermoplastic liners at both ends of metal sleeve 14 extend slightly beyond the ends of the sleeve. The purpose for extending the thermoplastic liners beyond the length of the metal sleeve 14 is to allow for compression of the thermoplastic parts as the valve is installed into the fluid handling system pipelines. As the retaining flanges, between which is mounted the check valve 1, are drawn together, the thermoplastic is compressed to form a seal at the interface 42 between the upstream liner 10 and the downstream liner 20 and between the ends of the valve 1 and the pipeline flanges.

The internal diameter of metal sleeve 14, illustrated in FIG. 1, is slightly larger than the outside diameter of the thermoplastic liners 10 and 20 so that the liners may be easily inserted into the sleeve. Because the thermoplastic liners will be slightly expanded within the sleeve 14 when installed into the pipelines, any differences in the sleeve's internal diameter and the outer diameter of liners 10 and 20 will be taken up in the expansion of the liners as their ends are compressed towards each other. In this manner, there will be a tight fit between the liners 10 and 20 and the sleeve 14. Sleeve 14 functions to provide structural strength to the valve 1 to withstand the internal pressures from the corrosive fluids. Since the thermoplastic materials alone are not capable of withstanding high internal pressures, especially where there is a thin wall between the internal passageway and the exterior of the thermoplastic liners, the metal sleeve 14 is required to provide the structural strength to withstand those internal pressures. While a stainless steel metal sleeve 14 is shown in FIG. 1 and FIG. 3 and disclosed herein, other metals that will provide the required structural strength to the thermoplastic parts could be used. One such metal is Monel, an alloy of stainless steel and nickel. Other metals such as carbon steel, aluminum, etc. could be used. To prolong the life of valve 1, it is preferable that the metal sleeve 14 be impervious to the corrosive environments in which the valve will be used.

FIG. 1 illustrates a wafer type thermoplastic check valve but an alternate embodiment of a flange type thermoplastic check valve is possible. In order to obtain a flange type valve, upstream liner 10 and downstream liner 20 would have to be of a larger outer diameter to permit flange bolt throughholes to be drilled in both liners the entire length of the valve. Correspondingly, the metal sleeve 14 must be larger in diameter to allow for the increased diameters of the liners 10 and 20. The flange type valve requires that the flange bolts, that connect the valve into the pipeline, pass through the thermoplastic material, while the wafer type valve requires that the bolts pass on the outside and around the valve. For both types of valves, the thermoplastic liners are captured between the two flanges as the flange bolts are secured.

In normal operation, as flow is directed against the flapper from the upstream side, the flapper 16 moves off the seat 22 due to the rotation of flapper 16 on the trunnions 32. When fully open, flapper 16 is clear of the flow media; hence, only a low pressure drop is experienced across the valve. Normally about a 1 psi drop in pressure occurs through valve 1 at the normal flow rate. Table I shows the size of the fluid handling system pipelines and the flow rate ($C_v$) that represent a 1 psi pressure drop across the valve 1.

TABLE I

| Size | $C_v$ Gallons Per Minute |
| --- | --- |
| 1" | 60 |
| 1¼" | 115 |
| 2" | 275 |
| 3" | 525 |
| 4" | 700 |

When flow through valve 1 ceases, gravity causes flapper 16 to rotate down to the closed position in which the sealing surface 24 of the flapper 16 comes to rest on the sealing surface 22 of the upstream liner 10. This contact is achieved before flapper 16 assumes a vertical position because of the inclined angle of sealing surface 22. As back pressure develops in the downstream liner 20, flapper 16 is urged against sealing surface 22 and a seal is achieved between the upstream liner 10 and the flapper 16. Although the thermoplastic material used to construct the flapper 16 and thermoplastic liners 10 and 20 do not have memory, the generally dome shape of sealing surface 24 of flapper 16 may be flattened by repeated checkings over a period of time. However, this does not cause the flapper to loose its ability to seal because the sealing surface 22 is a flat surface and a squashing of the top of the dome in sealing surface 24 merely increases the area of sealing surface 24 that is in contact with sealing surface 22. Thus the life of the flapper check valve is significantly increased over that of the ball type check valves.

In assembling the valve of FIGS. 1-3, the trunnion 32 and radial extension 30 of flapper 16 are inserted into the slots 36 and cutout 44 of downstream liner 20. Upstream liner 10, having alignment pin 28 mounted therein, is inserted into the stainless steel sleeve 14. The downstream thermoplastic liner 20, containing the flapper 16, is then inserted into the opposite end of sleeve 14 and rotated until guide pin 28 and an oppositely facing alignment hole 29 in the liner 20 are in alignment. Liner 20 is then pressed into contact with liner 10. At this point, guide pin 28 has been inserted into alignment hole 29 and the inclined faces of liners 10 and 20 are in contact.

Depending upon whether the valve is of the wafer type or the flange type, the valve is installed into the fluid handling pipeline between the flanges provided for the valve. The flange bolts which capture the check valve in the pipeline are inserted and installed. As the flange bolts are tightened, the thermoplastic liners 10 and 20, extending slightly beyond the ends of sleeve 14, are squeezed together until the stainless steel liner 14 contacts the flanges. At this point, the valve is installed in the pipeline. As discussed above, the flapper type check valve may be installed in the fluid handling system in any orientation with no change in its performance characteristics. This is because the flapper responds to the pull of gravity, with the valve 1 in either a horizontal or vertical orientation, to rotate from the full open to the full closed positions when the through flow in the pipeline is zero.

Because of the simplicity in the design of the internal components of the check valve 1 disclosed herein, replacement or worn parts is a relative simple manner. The valve, whether of a waffer or flange design, is removed from between the flanges by removing the flange bolts. For a waffer model, not all of the flange bolts need be removed to remove the valve from between the flanges. Once the valve is removed from between the flanges, the worn internal parts may be easily removed from the stainless steel sleeve, a new piece inserted and the valve quickly replaced in the line. The present invention provides a streamline check valve because all of the valve parts are contained within the cylindrical metal outer sleeve 14. Thus, the need for a bonnet to cover the hinged rotation point of the flapper and a flapper recess cavity is not needed. However, the stainless steel metal sleeve 14 is needed because the thermoplastic material, from which the upstream lever 10 and downstream liner 20 are constructed, is not capable of withstanding large internal pressures. As discussed previously, by providing the metal sleeve 14, the valve is able to withstand the normal expected internal pressures in the corrosive fluid handling systems.

In describing the invention, reference has been made to a preferred embodiment. However, those skilled in the art and familiar with the disclosure of the invention may recognize additions, deletions, substitutions or other modifications which would fall within the preview of the invention as defined in the appended claims.

What is claimed is:

1. A check valve having a fluid passageway extending therethrough for use in corrosive fluid handling systems comprising:
    an upstream cylindrical thermoplastic liner having a longitudinal throughbore with a center-line axis, said upstream liner having a mating downstream-facing end whose end surface defines a plane inclined to said upstream liner center-line axis;

a downstream cylindrical thermoplastic liner having a longitudinal throughbore with a center-line axis, and a diameter greater than said upstream liner throughbore, said downstream liner having a mating upstream-facing end whose end surface defines a plane similarly inclined to said down-stream liner center-line axis as said upstream liner mating end such that said upstream liner mating end, when contacting said downstream liner mating end, forms a coplanar interface with said upstream liner center-line axis in alignment with said downstream liner center-line axis;

a first sealing surface defined by the annular portion of said downstream-facing end surface of said upstream liner not in contact with said upstream-facing end surface of said downstream liner when said downstream and said upstream liners are in contact;

a disk-shaped flapper having a second sealing surface, said flapper rotatably mounted in said downstream liner and movable from a first position in which said flapper permits full-flow through said valve to a second position in which said second sealing surface of said flapper is in contact with said first sealing surface of said upstream liner; and a cylindrical sleeve for surrounding said upstream and said downstream liners in close relationship when said upstream and said downstream liners are in contact.

2. The device in accordance with claim 1 further comprising a guidepin for guiding and aligning said downstream liner into contact with said upstream liner to form said interface, said guidepin mounted in one of said liners with the other liner having an oppositely facing hole from said guidepin for accepting said guidepin when said upstream and said downstream liners are in contact.

3. The device in accordance with claim 1 wherein said flapper further comprises a metal screen moled into said flapper to provide greater strength and weight to said flapper.

4. The device in accordance with claim 3 wherein said metal screen is a stainless steel screen.

5. The device in accordance with claim 3 wherein said flapper further comprises a thermoplastic pin connected to said flapper for mounting said flapper in said downstream liner such that said rotatable flapper rotates about said pin.

6. The device in accordance with claim 1 wherein said inclined mating surface of said upstream and said downstream liners is inclined at an angle in the range of 5 to 20 degrees to their center-line axes.

7. The device in accordance with claim 1 wherein said cylindrical sleeve is a stainless steel sleeve.

8. The device in accordance with claim 1 wherein said thermoplastic liners and said rotatable flapper is made of tetrafluoroethylene.

9. A check valve comprising:

a cylindrical sleeve;

a first and second cylindrical thermoplastic element contained in said sleeve, said elements having throughholes whose centerline axes are in alignment, said second element throughhole diameter greater than said first element throughhole diameter;

a central passageway formed by said throughholes;

a first annular sealing surface formed on said first element around said central passageway in a plane inclined to the center-line axis of said passageway;

a disk-shaped rotatable flapper mounted to said second element, said flapper rotatable from a first position in which said flapper is out of said central passageway to a second position in which said flapper is contacting said first sealing surface; and a second sealing surface connected to said flapper for sealing against said first sealing surface when said flapper is in contact with said first sealing surface.

10. The device in accordance with claim 9 further comprising a guidepin for guiding said first element into proper alignment with said second element.

11. The device in accordance with claim 9 wherein said rotatable flapper further comprises a reinforcing material molded within said flapper to give added strength and weight to said flapper.

12. The device in accordance with claim 9 wherein said first and second elements and said flapper are fabricated from tetrafluoroethylene.

13. The device in accordance with claim 9 wherein said first sealing surface is inclined at an angle within the range of 5 to 20 degrees to the center-line axis of said central passageway.

* * * * *